United States Patent [19]

Strong et al.

[11] Patent Number: 4,799,377
[45] Date of Patent: Jan. 24, 1989

[54] DETECTOR FOR LEAKS OR ORIFICES

[75] Inventors: Michael R. Strong, Midland, Mich.; Allen T. Puder, Los Altos, Calif.; Ronald W. Wieck, Bay City, Mich.

[73] Assignee: Dow Corning Corporation, Midland, Mich.

[21] Appl. No.: 152,776

[22] Filed: Feb. 5, 1988

[51] Int. Cl.[4] ............................................. G01M 3/26
[52] U.S. Cl. ......................................................... 73/40
[58] Field of Search ................................... 73/40, 49.2

[56] References Cited

U.S. PATENT DOCUMENTS 3,529,463 9/1970 Orlando et al. ..................... 73/49.2

Primary Examiner—Stewart J. Levy
Assistant Examiner—Joseph W. Roskos
Attorney, Agent, or Firm—Allan O. Maki

[57] ABSTRACT

An apparatus for testing for leaks in individual cavities, such as pin sockets, in a component, such as an electrical connector, in which the pin sockets or other cavities to be tested for leaks extend into the component from a surface of the component is provided. The apparatus of this invention includes resilient surface for sealingly engaging the surface of the component which surrounds the sockets or other cavities. There is provided through the resilient surface a plurality of deformation resistant apertures, which may be, for example, hollow metal tubes, such as hypodermic needles protruding through the resilient surface. The apertures are geometrically arranged to correspond to the arrangement of the cavities so that one aperture is in alignment with the opening of each cavity. Each of the apertures is connected by a conduit to a pressure sensor, which is capable of measuring the rate of pressure decay or leakage out of the test section or cavity. Provision is also made for simultaneously introducing a gas under pressure to each of the apertures. A suitable valve mechanism is provided for turning off the gas supply so that the rate of leakage, after such pressurization of the cavities, can be measured.

8 Claims, 3 Drawing Sheets

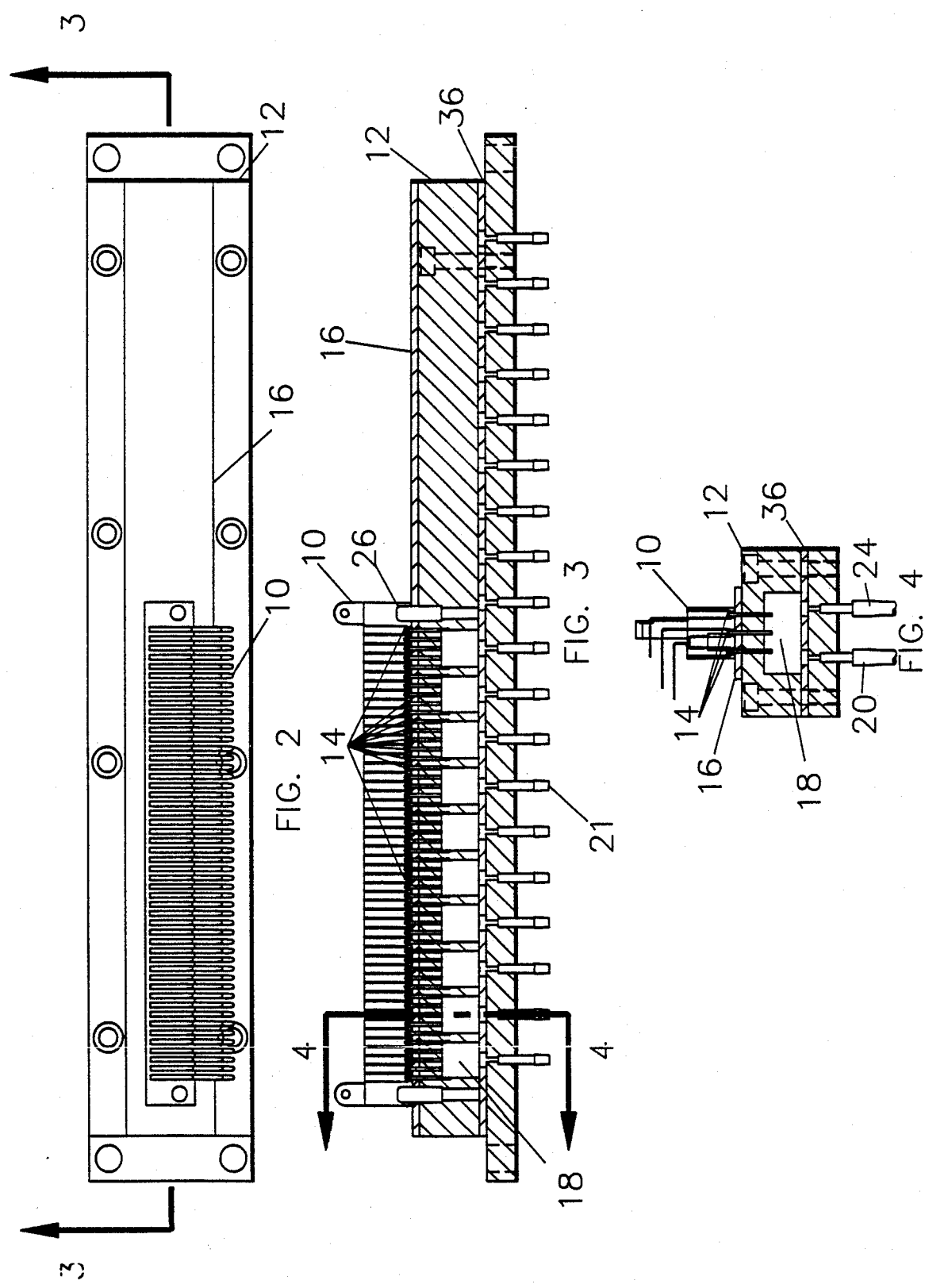

DETECTOR FOR LEAKS OR ORIFICES

In order to prevent corrosion or other deterioration of electronic boards and connectors it has been found desirable to encapsulate the boards and soldered connector leads with a polymeric coating commonly referred to as a conformal coating. Such coatings are required in the case of many military, aerospace, automotive, and other applications where stability of the electronic components is critical. A problem which has developed, however, is that when a board or component to which a connector has been attached is coated by dipping, the pin sockets in the connector may become plugged with the encapsulating polymer and thus become nonconductive or otherwise nonfunctional. Also, in service, if a leak is present, the connector may be exposed to damaging conditions. It has hithertofore been proposed to eliminate this problem by backfilling the connectors with a suitable resin which is cured, for example, by heat, ultraviolet light, or other catalytic means. However, it has been difficult to check the connectors after backfilling to determine whether or not the backfilling was entirely effective, so that none of the sockets have leaks in them of a size sufficient to permit the encapsulating resin to invade the connector. This problem is particularly difficult due to the fact that the connectors commonly in use utilize a large number of sockets, generally between 10 and 300.

The present invention provides a novel apparatus for testing simultaneously a large number of pin sockets on a connector or for testing multiple connectors. In a further embodiment the invention provides a means for a multiphase testing wherein large multi-pin sections of a connector can be tested. In the event that a leak is determined to exist in a particular section, further individual testing of sockets in that specific section can be conducted utilizing the same test apparatus.

Previously any testing for leaks was nearly impractical because it had to be performed on an individual pin by pin basis. The present invention provides novel apparatus for such leak testing which was hitherto deemed to be impractical to accomplish.

In addition to electrical connectors there has been a need for a device which will accurately detect the existence and magnitude of holes or orifices in other types of components in which there is a multiplicity of cavities or indentations. Some such applications include components of automatic control devices or pneumatic control devices. In addition to testing such components for the existence of orifices, the magnitude of such orifices can be determined or calibrated.

SUMMARY OF THE INVENTION

The present invention provides a novel test apparatus for checking an article such a multipin electrical connector to determine, firstly, whether any leaks exist, secondly, the precise location of any such leaks which have been detected, and thirdly, the size of such leaks. The principle object of the invention is to provide such apparatus which, in use, seals off a section of a connector (which may have an irregularly shaped surface) but maintains connection to the individual pin sockets in such sealed off section. Means is further provided to place each test area, which may be either a block of pin sockets, or an individual pin socket, in communication by suitable conduit means with a measuring means capable of measuring the rate of gas leakage from the test area.

A further object of the invention is to provide a test apparatus which utilizes the rate of pressure decay from a test area to determine whether a leak is present. Another object is to provide such test apparatus which could determine the magnitude of any leak which is detected. Another object is to provide such apparatus which utilizes a novel valve to cut off communication of a source of pressurized gas used for test purposes with the test area so as to permit the subsequent measurement of the rate of pressure decay from the test area.

The objects of the invention are achieved by providing an apparatus for testing for leaks in individual cavities, such as pin sockets, in a component, such as an electrical connector, in which the pin sockets or other cavities to be tested for leaks extend into said component from a surface of the component. The apparatus of this invention includes resilient means for sealingly engaging said surface of the component which surrounds the sockets or other cavities. Also provided is a means of communication between the cavities being tested and the pressure test means. Such communication is provided through the resilient means by a plurality of deformation resistant apertures, which may be, for example, hollow metal tubes, such as hypodermic needles protruding through said resilient means. Said apertures are geometrically arranged to correspond to the arrangement of said cavities so that one aperture is in alignment with the opening of each cavity. This arrangement also aids in alignment of the electrical connector at the proper position on the test device. Each of said apertures is connected by a conduit to a pressure sensing means, which is capable of measuring the rate of pressure decay or leakage out of the test section or cavity. Means is also provided for simultaneously introducing a gas under pressure to each of the apertures. A suitable valve mechanism is provided for turning off the gas supply so that the rate of leakage after such pressurization of the cavities can be measured by the pressure sensing means. A preferred form of valve for use in connection with the invention is disclosed in a co-pending application filed simultaneously herewith.

Optionally, in accordance with a preferred embodiment of the invention, a number of large sections of the connector can initially be tested simultaneously. As to any section found to contain a leak, each pin in such section can be checked to determine precisely the location of the leak. In such embodiment the individual cavity contacting apertures can be dispensed with, provided that each test section is provided with a suitable seal which effectively seals off the entire perimeter of such section.

DRAWINGS

The invention will be more fully set forth in the following detailed description and accompanying drawings, wherein:

FIG. 2 is a top view of a test manifold portion of the apparatus with an electrical connector in position thereon to be tested.

FIG. 3 is a cross-sectional view taken along line 3—3 of FIG. 2,

FIG. 4 is a cross-sectional view taken along line 4—4 of FIG. 3, and,

DETAILED DESCRIPTION OF THE INVENTION

Figure 1:
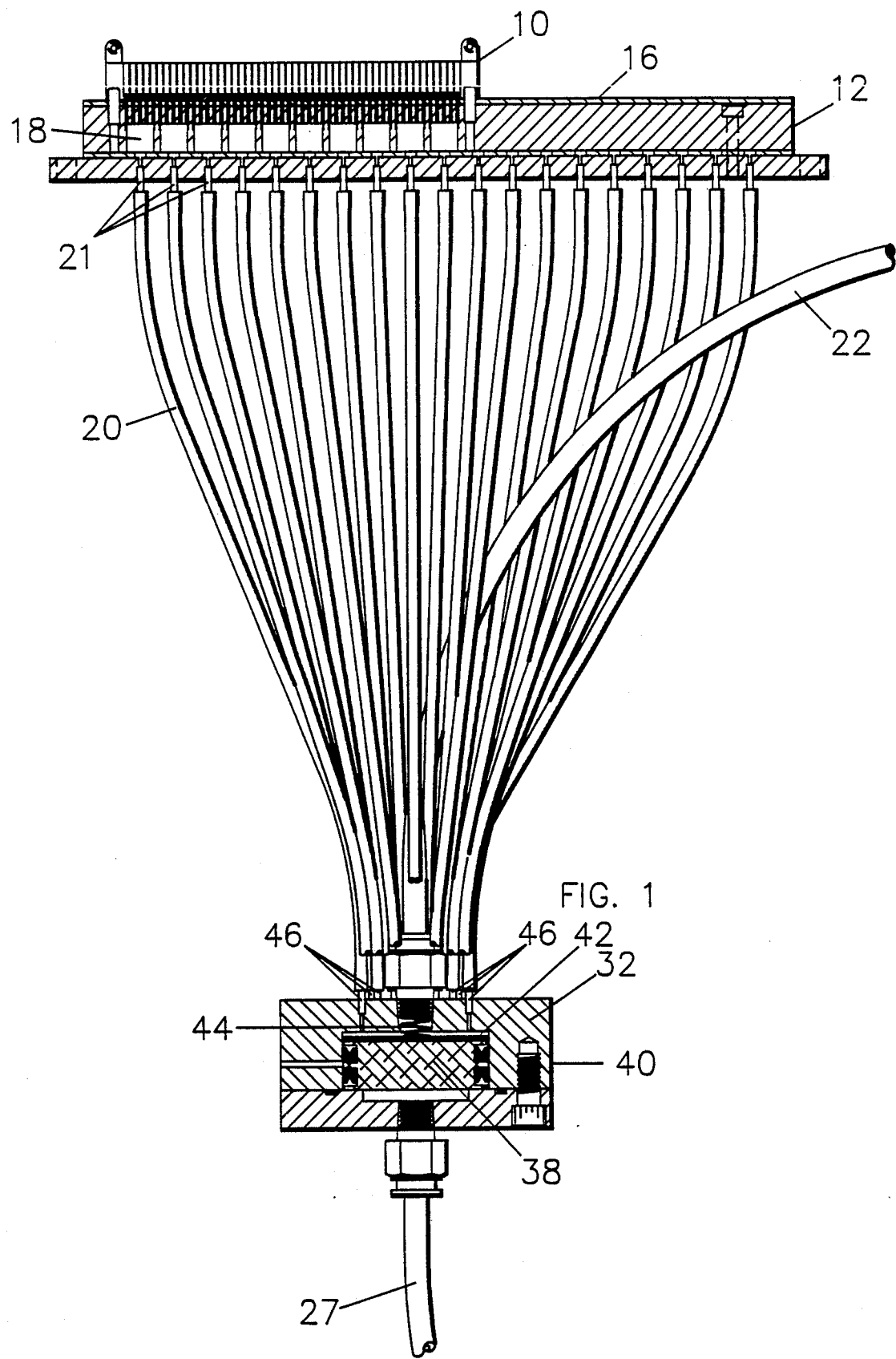
FIG. 1 is an assembly drawing of test apparatus of the invention with parts broken away and with the valve and test manifold shown in cross-section.
Figure 5:
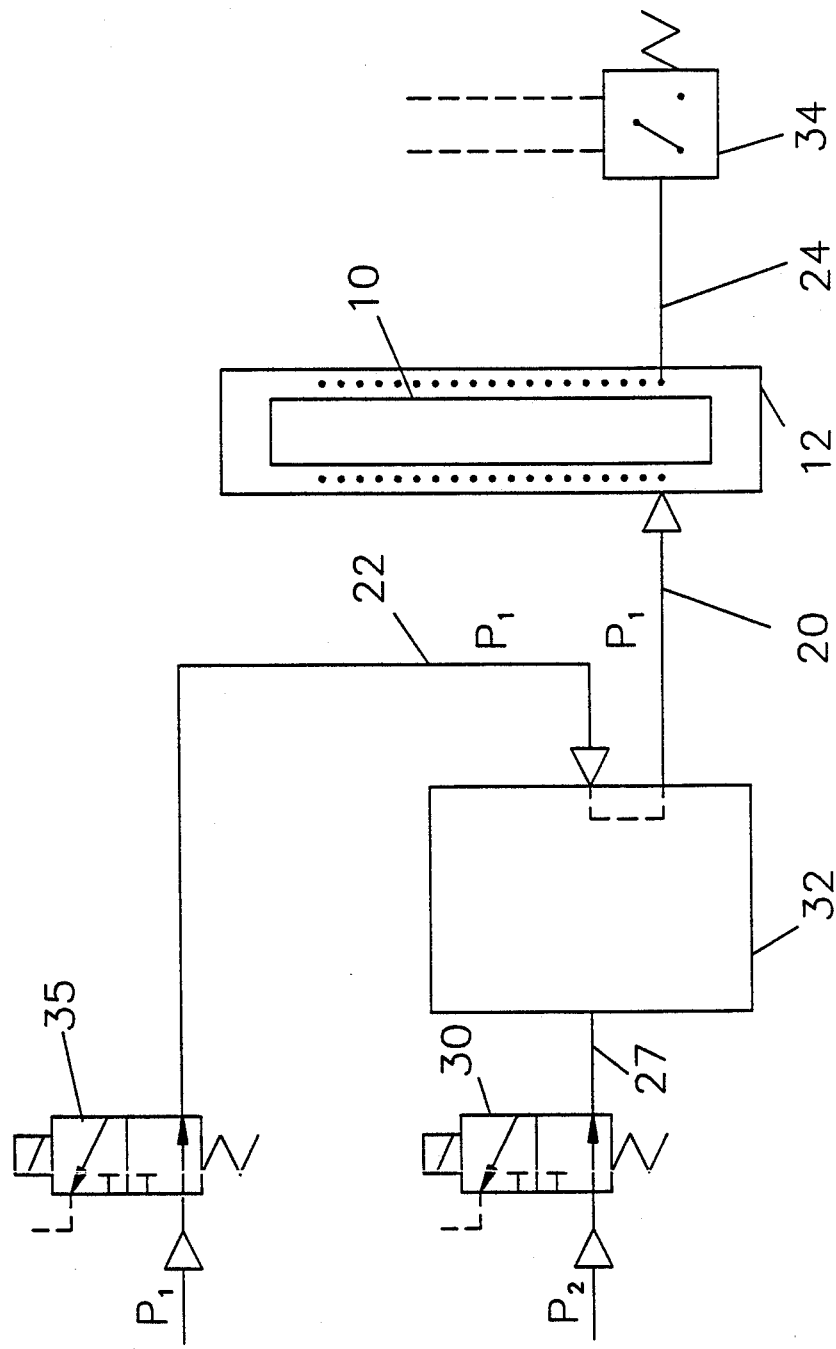
FIG. 5 is a schematic diagram showing the interconnection of the components of the apparatus.

Referring specifically to the the drawings, there is shown an electrical connector 10 of conventional design. In operation, the connector 10 to be tested is set on manifold 12 and clamped in place. Manifold 12 is preferably a block of metal or other solid material that has a series of tubes 14, preferably hypodermic needles, set in it which protrude up through elastomeric gasket material 16. The tubes 14 are pressed into a chamber 18 which has openings on the back for connecting each individual tube by means of air hoses or conduits 20 to an air pressure supply 22 through valve 32. Manifold 12 is also connected to pressure sensors 34 by means of tubes or conduits 24. Each tube is connected with a separate pressure sensor so that each individual pin socket or similar cavity can be individually be tested for air leakage (pressure decay). Locating pins 26 may be included to assist in locating the connector in the proper location on the manifold 12.

Tubes 14 are arranged to match the pattern of the openings on connector 10, and also serve to keep the small diameter holes in the gasket open when the connector is clamped on manifold 12. First three way solenoid valve 30 is then cycled to block the flow of high pressure gas (P2) through tubing 27 allowing the air valve 32 to open and thus to permit the test gas (P1) to flow in at the test pressure to each cell. After the air pressure, as measured by the sensors 34, reaches a predetermined point the valve 32 is closed by cycling the first three way solenoid 30 allowing high pressure gas, P2 to move the piston 38 forward thus shutting off each pin socket or cavity from the air supply (P1) and also from each of the other pin sockets.

The decrease, if any, in pressure is then measured by pressure sensors 34 after a predetermined period of time. This pressure drop can be compared with one established during a calibration mode. The cavity being tested is thus either passed or failed. The first solenoid 30 is again cycled to open the air valve and the second solenoid 35 is cycled to relieve the test air pressure in order to permit safe removal of the connector from the manifold.

By observing the rate of change in pressure during the cycle, the magnitude of any leaks can be determined. This is made possible by the design of the electronics and the extreme air tightness of the tester. The time of pressure decay observation need only be a second or a fraction thereof due to the small amount of tubing utilizied, the small air reservoir, and the speed of the electronics. Determination of the size of the leaks is a valuable means of using statistical process control to determine how well backfilling or other sealing process is performing. Control of such processes is thereby made possible.

A preferred form of valve, disclosed and claimed in a copending application is shown in FIG. 1. Supply P1 of low pressure test gas enters the valve interiorly of a compression spring 44 which urges the valve toward the open position. Outlet ports 46 convey the gas to conduits 20 and then to manifold 12 by way of inlet nipples 21. Suitable channels 18 within the manifold 12 convey the gas to individual tubes 14, or group of tubes, which direct the flow into each corresponding pin socket, or group of pin sockets, of connector 10. As will be seen in FIG. 1, the inlet and outlet ports of valve 32 are located at the end of a cylinder 40 which contains a movable piston 38. The end of piston 38 is covered by a layer of resilient elastomeric material 42, which simultaneously closes the inlet port and all outlet ports, when the piston is moved to the closed position. In the illustrated embodiment the movement of piston 38 to the closed position is actuated by a supply of high pressure fluid which enters the valve through conduit 27. After the test cycle is complete, the piston is allowed to move to the open position again by the action of spring 44 (when the supply P2 of high pressure gas has been tuned off).

Manifolds of a shape to match various types of connectors can be provided. It will be apparent that by using a split manifold arrangement, the half which mates with the connector can be changed, thus allowing for the testing of different types of connectors without having to change the air tubing. The two halves may be attached to each other and sealed with appropriate gasket means 36.

In testing a connector with a large number of pins, ie, greater than 40, it is possible to use a multipe stage test to increase speed. Such process involves the use of a gross leak test manifold as shown, which has channels 18 that join together a number of individual cavities so that the presence of a leak in the entire section can be detected. Alternatively, a manifold having a gasket means which seals the periphery of the connector, and dispenses with the individual tubes can be utilized for purposes of a gross test of a multipin section of a connector. After such gross test, if a leak is determined to exist in a particular section, the cavities in that section would be checked individually using the appropriate manifold, which does contain tubes individually in communication with each pin socket to be tested. If the entire section, on the other hand, passes the test, the test is complete insofar as such section is concerned.

It will be apparent that the present invention provides a novel test apparatus which requires the use of only two solenoids. Solenoids have been found not to be suitable for the purpose of shutting off the lines between the individual cavities to be tested and the pressure test means due to the unavailability of solenoid actuated valves which are sufficiently air tight to permit detection of extremely small leaks.

It is to be understood that the foregoing embodiments are to be considered illustrative of the invention. Various modifications, changes or alterations of the invention disclosed herein may be evident to those skilled in the art and thus the invention disclosed herein is not intended to be limited by the description hereinabove but rather, is intended to be limited only by the appended claims.

What is claimed is:

1. Apparatus for testing for the existence and magnitude of leaks or orifices in individual cavities in a component which comprises a multiplicity of cavities extending into said component from a surface thereof comprising:
   a manifold provided with resilient means for sealingly engaging said surface, to hermetically seal said cavities from the environment
   a plurality of deformation resistant apertures protruding through said resilient means, said apertures being geometrically arranged to correspond to the arrangement of said cavities so that one aperture is in alignment with the opening of each cavity, each of said apertures being connected by a conduit to a pressure sensing means, supply means for simultaneously introducing a gas under pressure to each of said apertures, and valve means for severing the said supply of gas to permit measurement by said sensors of the rate of decay of pressure in said cavities and, a plurality of manifolds, each of which is adapted to seal off from the environment a plurality of cavities, whereby a first leak detection test can be conducted to detect leaks in each group of cavities so sealed off, and in the event any such group is found to contain a leak, the first mentioned manifold can be employed to precisely locate the position and size of any such leak.

2. Apparatus according to claim 1 wherein said resilient means is an elastomeric polymer.

3. Apparatus for testing for leaks in individual pin sockets in an electrical connector having a multiplicity of pin sockets comprising:

resilient means for sealingly engaging the surface of said connector to hermetically seal said pin sockets from the environment, a plurality of deformation resistant apertures protruding through said resilient means, said apertures being geometrically arranged to correspond to the arrangement of said pin sockets so that one aperture is in alignment with each pin socket, each of said apertures being connected by a conduit to a air pressure sensing means, supply means for simultaneously introducing air under pressure to each of said pin sockets, and, valve means for severing the said supply of air to permit measurement by said sensors of the rate of decay of air pressure in said pin sockets.

4. Apparatus according to claim 3 wherein said apertures are formed from hypodermic needles.

5. Apparatus according to claim 4 wherein said resilient means is a silicone elastomer.

6. A method of testing a multiple pin electrical connector for leaks comprising:

(A) providing an apparatus which includes resilient means for sealingly engaging the surface surface of said connector to hermetically seal said pin sockets from the environment, a plurality of deformation resistant apertures protruding through said resilient means, said apertures being geometrically arranged to correspond to the arrangement of said pin sockets so that one aperture is in alignment with each pin socket, each of said apertures being connected by a conduit to a air pressure sensing means, supply means for simultaneously introducing air under pressure to each of said pin sockets, and, valve means for severing the said supply of air to permit measurement by said sensors of the rate of decay of air pressure in said pin sockets, a multiplicity of second manifolds, each of which is adapted to seal off from the environment a multiplicity of cavities, (B) securing a multiple pin electrical connector on said apparatus by first attaching said second group of manifolds over sections of said connector, each of which sections comprises multiple pin sockets, said manifold being attached to hermetically seal each of said pin socket section from the environment, (C) introducing a gas under pressure into said manifolds, (D) shutting off the supply of said gas, (E) measuring the gas pressure in each of said manifolds for a predetermined length of time, (F) removing the connector from said manifolds, (G) as to only such multipin sections, if any, in which the pressure was observed to decay in step (E) to the extent that a leak was indicated, placing the connector over said first mentioned manifold with an aperture opening into each pin socket of such section, and repeating steps (C) through (F) as to such section.

7. A method of testing for the existence and magnitude of leaks or orifices in individual cavities in a component which contains a multiplicity of cavities extending into said component from a surface thereof comprising:

(A) providing an apparatus which includes resilient means for sealingly engaging the said surface of said component to hermetically seal said cavities from the environment, a plurality of deformation resistant apertures protruding through said resilient means, said apertures being geometrically arranged to correspond to the arrangement of said cavities so that one aperture is in alignment with each cavity, each of said apertures being connected by a conduit to a air pressure sensing means, supply means for simultaneously introducing air under pressure to each of said cavities, and, valve means for severing the said supply of air to permit measurement by said sensors of the rate of decay of air pressure in said cavities, a multiplicity of second manifolds, each of which is adapted to seal off from the environment a multiplicity of cavities, (B) securing a multiple cavity component on said apparatus by first attaching said second group of manifolds over sections of said component, each of which sections comprises multiple cavities, said manifold being attached to hermetically seal each of said sections from the environment, (C) introducing a gas under pressure into said manifolds, (D) shutting off the supply of said gas, (E) measuring the gas pressure in each of said manifolds for a predetermined length of time, (F) removing the component from said manifolds, (G) as to only such multipin sections, if any, in which the pressure was observed to decay in step (E) to the extent that a leak was indicated, placing the connector over said first mentioned manifold with an aperture opening into each cavity of such section, and repeating steps (C) through (F) as to such section.

8. Method according to claim 7 wherein said cavities are pin sockets in an electrical connector which have been backfilled with a polymeric sealing composition.

* * * * *